United States Patent [19]

Lazar

[11] Patent Number: 4,741,774

[45] Date of Patent: May 3, 1988

[54] PLASTIC COLORED CRAYON

[76] Inventor: Salvator Lazar, Hakim Street 22, Holon, Israel

[21] Appl. No.: 942,219

[22] Filed: Dec. 16, 1986

[51] Int. Cl.$^4$ ............................................. C09D 13/00
[52] U.S. Cl. ...................................... 106/19; 106/26; 106/27; 106/31
[58] Field of Search ......................... 106/19, 26, 31, 27

[56] References Cited

U.S. PATENT DOCUMENTS

| | | | |
|---|---|---|---|
| 3,639,310 | 2/1972 | Andrews | 106/26 |
| 3,769,045 | 10/1973 | Maierson et al. | 106/19 |
| 3,907,567 | 9/1975 | Nihyakumen et al. | 106/19 |
| 4,212,786 | 7/1980 | Murakami | 106/19 |
| 4,351,185 | 9/1982 | Garcia | 106/19 |
| 4,525,214 | 6/1985 | Panken | 106/27 |

Primary Examiner—Paul Lieberman
Assistant Examiner—Willie J. Thompson
Attorney, Agent, or Firm—Benjamin J. Barish

[57] ABSTRACT

A plastic colored crayon, comprises: an outer layer of plastic; and an inner, abradable, colored core comprising a mixture of ethyl hydroxyethyl cellulose, a plastic binder, wax and coloring matter.

19 Claims, No Drawings

PLASTIC COLORED CRAYON

BACKGROUND OF THE INVENTION

The present invention relates to plastic colored crayons or pencils, and particularly to artcicles not made with the conventional wax formulations, but rather with plastic-based formulations.

SUMMARY OF THE INVENTION

According to the present invention, there is provided a plastic colored crayon, comprising: an outer layer of plastic, and an inner, abradable, colored core comprising a mixture of ethyl hydroxyethyl cellulose, a plastic binder, wax and coloring matter.

The ethyl hydroxyethyl cellulose used in the examples described below is EHEC 50, supplied by Hercules Inc., Wilmington, Del. It is a mixed cellulose ether prepared by a process involving three reactions:

1. Alkali cellulose formation in which cellulose is swollen by aqueous NaOH:

$$Cell-OH + NaOH = Cell-OH \cdot NaOH$$

2. Hydroxyethylation, an alkali-catalyzed reaction:

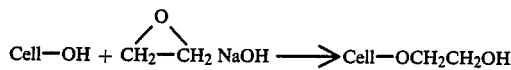

3. Ethylation of hydroxyethylcellulose:

(a) $Cell-OCH_2CH_2OH + NaOH + C_2H_5Cl \longrightarrow$ $$Cell-OCH_2CH_2OC_2H_5 + NaCl + H_2O$$

(b) $Cell-OH + NaOH + C_2H_5Cl \longrightarrow$ $$Cell-OC_2H_5 + NacL + H_2O$$

This material is a film-former used in various applications of protective coatings and decorative packaging. As far as I am aware it has not been used in the type of application of the present invention.

Preferably, the ethyl hydroxyethyl cellulose is present from 8-30% by weight of the colored core, and the colored core mixture further includes stearic acid present from 20-40% by weight.

A wide variety of plastic binders may be used in the colored core according to the particular properties desired. For purpose of example, embodiments of the invention are described below wherein the plastic binder in the colored core is or includes a copolymer of ethylene-vinyl alcohol, cellulose acetobutyrate, or a polymer of isobutyl methacrylate. The plastic binder is preferrably present from 5-20% by weight.

A wide selection of wax ingredients may also be included. For purposes of example, embodiments are described below wherein the wax is or includes carnauba wax, paraffin wax, microcrystalline wax, bisamide wax, and low molecular weight polyethylene wax. Preferrably, the wax constituents are present from 10-40% by weight of the colored core.

Various plastics may also be used for the outer plastic layer. In the described preferred embodiments, the outer plastic layer includes a copolymer of ethylene-vinyl acetate, preferably a mixture of the low visocsity copolymer with the high viscosity copolymer, and is present from 30-50% by weight of the outer plastic layer. The outler plastic layer also preferably includes stearic acid from 15-30% by weight, and a wax, the described preferred embodiment including paraffin wax and low molecular weight polyethylene wax. Also included in the outer plastic layer is a pigment.

DESCRIPTION OF PREFERRED EMBODIMENTS

The following are several examples of plastic colored crayons constructed in accordance with the present invention:

EXAMPLE 1

The outer plastic layer is constructed from a mixture including the following, the parts being by weight:
- 25% copolymer of ethylene-vinyl acetate, high viscosity (PVA 17%)
- 15% copolymer of ethylene-vinyl acetate, low biscosity (PVA 17%)
- 20% stearic acid
- 17% paraffin wax
- 20% low molecular polyethylene wax
- 3% pigments iron oxide (yellow)

The inner, abradable, colored core includes the following mixture (for the color blue), the parts being by weight:
- 15% carnauba wax
- 10% medium viscosity copolymer of ethylene - vinyl alcohol (ELVON -DuPont)
- 20% ethyl hydroxyethyl cellulose
- 30% stearic acid
- 15% petrolatum
- 6% phtalocyanine blue
- 4% titanium dioxide The outer layer is first prepared by injection moulding the mixture. The materials of the inner core are mixed and heated to a temperature of approximately 140° C., and then injection moulded under pressure into the outer layer at a temperature of approximately 115° C. via an air piston.

EXAMPLE 2

The outer plastic layer is prepared in the same manner and with the same materials as in Example 1. The inner, abradable, colored core is prepared in the same manner as in Example 1, but with the following ingredients, the parts being by weight:
- 8% carnauba wax
- 7% vestowax c 20 (Fischer tropsch oxidate)
- 8% medium viscosity copolymer of ethylene-vinyl alcohol (Elvon)
- 8% paraffin wax
- 10% ethyl hydroxyethyl cellulose
- 10% cellulose acetobutyrate (C.A.B 500-5) bisamidle wax
- 8% bisamide wax
- 25% stearic acid
- 14% vaseline
- 6% phtalocyanine blue
- 4% titanium dioxide

EXAMPLE 3

The outer plastic layer is prepared in the same manner and with the same materials as in Example 1. The inner, abradable, colored core is also prepared in the same manner as in Example 1, except with the following materials, the parts being by weight:

5% carnauba wax
25% ethyl hydroxyethyl cellulose
5% microcrystalline wax
10% low molecular polyethylene wax (A wachs)
6% bisamide wax
5% polymer of isobutyl methacrylate
25% stearic acid
19% petrolatum
6% phtalocyanine blue
4% titanium dioxide.

The above-described examples for the colored core include a blue pigment for producing a blue core. Conventional pigments would be used for producing cores of other colors, for example a mixture of iron oxide and carbon black for a brown core, carbon black alone for black core, etc.

The plastic-based colored crayons or pencils produced in accordance with the present invention may be used, and sharpened by a pencil sharpener, in the same manner as conventional crayons or pencils having a wooden outer layer and a wax-based or graphite based abradable colored core.

It will be appreciated that the plastic colored crayons could be produced by continuous extrusions rather by injection moulding.

While the invention has been described with respect to several preferred examples, it will be appreciated that these are set forth merely for illustrative purposes, and that many other variations, modifications and applications of the invention may be made.

What is claimed is:

1. A plastic colored crayon, comprising: an outer layer of plastic; and an inner, abradable, colored core comprising a mixture of ethyl hydroxyethyl cellulose, a plastic binder, wax and coloring matter; said ethyl hydroxyethyl cellulose being present from 8-30% by weight of the colored core.

2. The plastic colored crayon according to claim 1, wherein said mixture of the colored core further includes stearic acid.

3. The plastic colored crayon according to claim 2, wherein said stearic acid is present from 20-40% by weight of the colored core.

4. The plastic colored crayon according to claim 1, wherein said plastic binder of the colored core includes a copolymer of ethylene-vinyl alcohol.

5. The plastic colored crayon according to claim 4, wherein said plastic binder of the colored core also includes celluose acetobutyrate.

6. The plastic colored crayon according to claim 1, wherein said plastic binder of the colored core includes a polymer of isobutyl methacrylate.

7. The plastic colored crayon according to claim 1, wherein said plastic binder of the colored core is present from 5-20% by weight of the colored 8. The plastic colored crayon according to claim 1, wherein said wax of the colored core is or includes carnauba wax.

9. The plastic colored crayon according to claim 1, wherein said wax of the colored core is or includes paraffin wax.

10. The plastic colored crayon according to claim 1, wherein said wax of the colored core is or includes microcrystallin wax.

11. The plastic colored crayon according to claim 1, wherein said wax of the colored core is or includes bisamide wax.

12. The plastic colored crayon according to claim 1, wherein said wax of the colored core is or includes low molecular weight polyethylene wax.

13. The plastic colored crayon according to claim 1, wherein said wax of the colored core is present from 10-40% of the weight of the colored core.

14. The plastic colored crayon according to claim 1, wherein said outer plastic layer is or includes a copolymer of ethylene-vinyl acetate.

15. The plastic colored crayon according to claim 14, wherein said copolymer of ethylene-vinyl acetate is present from 30-50% by weight of the outer layer.

16. The plastic colored crayon according to claim 14, wherein said outer plastic layer is or includes a mixture of low viscosity copolymer of ethylene-vinyl acetate and high viscosity copolymer of ethylene-vinyl acetate.

17. The plastic colored crayon according to claim 1, wherein said outer layer further includes stearic acid.

18. The plastic colored crayon according to claim 17, wherein stearic acid is present from 15-30% by weight of the outer layer.

19. The plastic colored crayon according to claim 1, wherein said outer layer further includes a wax.

* * * * *